United States Patent
Draznin et al.

(10) Patent No.: US 11,316,855 B2
(45) Date of Patent: Apr. 26, 2022

(54) SYSTEMS AND METHODS FOR PRIVATE NETWORK AUTHENTICATION AND MANAGEMENT SERVICES

(71) Applicant: Verizon Patent and Licensing Inc., Arlington, VA (US)

(72) Inventors: Sagiv Draznin, Walnut Creek, CA (US); Lalit R. Kotecha, San Ramon, CA (US); Patricia R. Chang, San Ramon, CA (US); Arda Aksu, Lafayette, CA (US); Jin Yang, Orinda, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 247 days.

(21) Appl. No.: 16/411,610

(22) Filed: May 14, 2019

(65) Prior Publication Data
US 2020/0366677 A1    Nov. 19, 2020

(51) Int. Cl.
*H04L 29/06*    (2006.01)
*H04W 12/06*    (2021.01)
*H04W 12/00*    (2021.01)
*H04W 12/43*    (2021.01)

(52) U.S. Cl.
CPC ...... *H04L 63/0884* (2013.01); *H04L 63/0281* (2013.01); *H04L 63/0853* (2013.01); *H04L 63/102* (2013.01); *H04W 12/06* (2013.01); *H04W 12/43* (2021.01)

(58) Field of Classification Search
CPC ............... H04L 63/0884; H04L 63/102; H04L 63/0853; H04L 63/0281; H04W 12/43; H04W 12/06; H04M 3/42
See application file for complete search history.

(56) References Cited

U.S. PATENT DOCUMENTS

| | | | | |
|---|---|---|---|---|
| 10,136,318 B1* | 11/2018 | Hancock | ............. | H04L 63/0876 |
| 2004/0095924 A1* | 5/2004 | Holur | ...................... | H04L 63/08 |
| | | | | 370/352 |
| 2004/0208153 A1* | 10/2004 | Mizell | ................... | H04L 45/306 |
| | | | | 370/338 |
| 2009/0250513 A1* | 10/2009 | Shoemaker | .......... | H04B 5/0031 |
| | | | | 235/380 |
| 2010/0153535 A1* | 6/2010 | Thayer | .................... | H04L 61/30 |
| | | | | 709/223 |
| 2015/0289140 A1* | 10/2015 | Rudolph | ............... | H04W 8/205 |
| | | | | 455/411 |
| 2019/0174314 A1* | 6/2019 | Joseph | ................... | H04W 12/40 |
| 2020/0186574 A1* | 6/2020 | Amin | ...................... | H04L 45/02 |

* cited by examiner

*Primary Examiner* — Fatoumata Traore
*Assistant Examiner* — Thomas A Gyorfi (57) ABSTRACT

Systems and methods described herein provide a private network management service for enterprise networks with wireless access. The systems and methods receive, within a provider network and from a user of a private network, parameters for multiple subscription profiles; associate the multiple subscription profiles with an identifier for the private network to create private network subscription profiles; store the private network subscription profiles; and provide at least a portion of the private network subscription profiles from a core network of the provider network to an authentication proxy in the private network. The authentication proxy performs authentication for end devices locally based on the private network subscription profiles.

20 Claims, 8 Drawing Sheets

SYSTEMS AND METHODS FOR PRIVATE NETWORK AUTHENTICATION AND MANAGEMENT SERVICES

BACKGROUND

Service providers are using software-defined wide area network (SD-WAN) technology to give enterprise customers more flexible, open, cloud-based WAN services, rather than installing proprietary or specialized WAN technology that often involves expensive fixed circuits or proprietary hardware. In an enterprise setup, a customer may have multiple sites/branches and data centers. Currently, enterprise customers on private networks must go through a Mobile Network Operator (MNO) administrator to manage user accounts.

DETAILED DESCRIPTION OF THE PREFERRED EMBODIMENTS

The following detailed description refers to the accompanying drawings. The same reference numbers in different drawings may identify the same or similar elements.

Private networks using cellular wireless standards are a promising connectivity model. The focus in the industry has gravitated toward applying broadband cellular network standards, such as Long Term Evolution (LTE) and 5G standards, to private wireless networks using unlicensed or shared radio frequency (RF) spectrum. The low transmit power required for signals in unlicensed or shared spectrum permits relatively dense placement of small private network cells. End devices using these private networks may be configured to access the private network, a Mobile Network Operator (MNO) network, or both networks.

Management of subscriber services can be intricate and time-consuming, given the ever-increasing number of applications, user-types, sites, and devices proliferating throughout an enterprise. For example, users/end devices may be associated with different combinations of user groups (e.g., accounting, human resources, marketing, etc.), applications (e.g., social media, voice-over-IP, video streaming, machine-type communications, etc.), and/or services (e.g., mobile edge computing (MEC) access, cloud computing, services, private network access, MNO access, etc.).

Systems and methods described herein provide a private network management service in which enterprise customers can provision, configure, and manage enterprise users/end devices and authenticate users on private networks. According to implementations described herein, a network device within a provider network may receive, from a user of a private network, parameters for multiple subscription profiles. The network device may associate the multiple subscription profiles with an identifier for the private network to create private network subscription profiles. The network device may store the private network subscription profiles in a wireless core network and provide at least a portion of the private network subscription profiles to an authentication proxy in the private network. The authentication proxy may perform authentication for end devices locally based on the private network subscription profiles.

Figure 1:
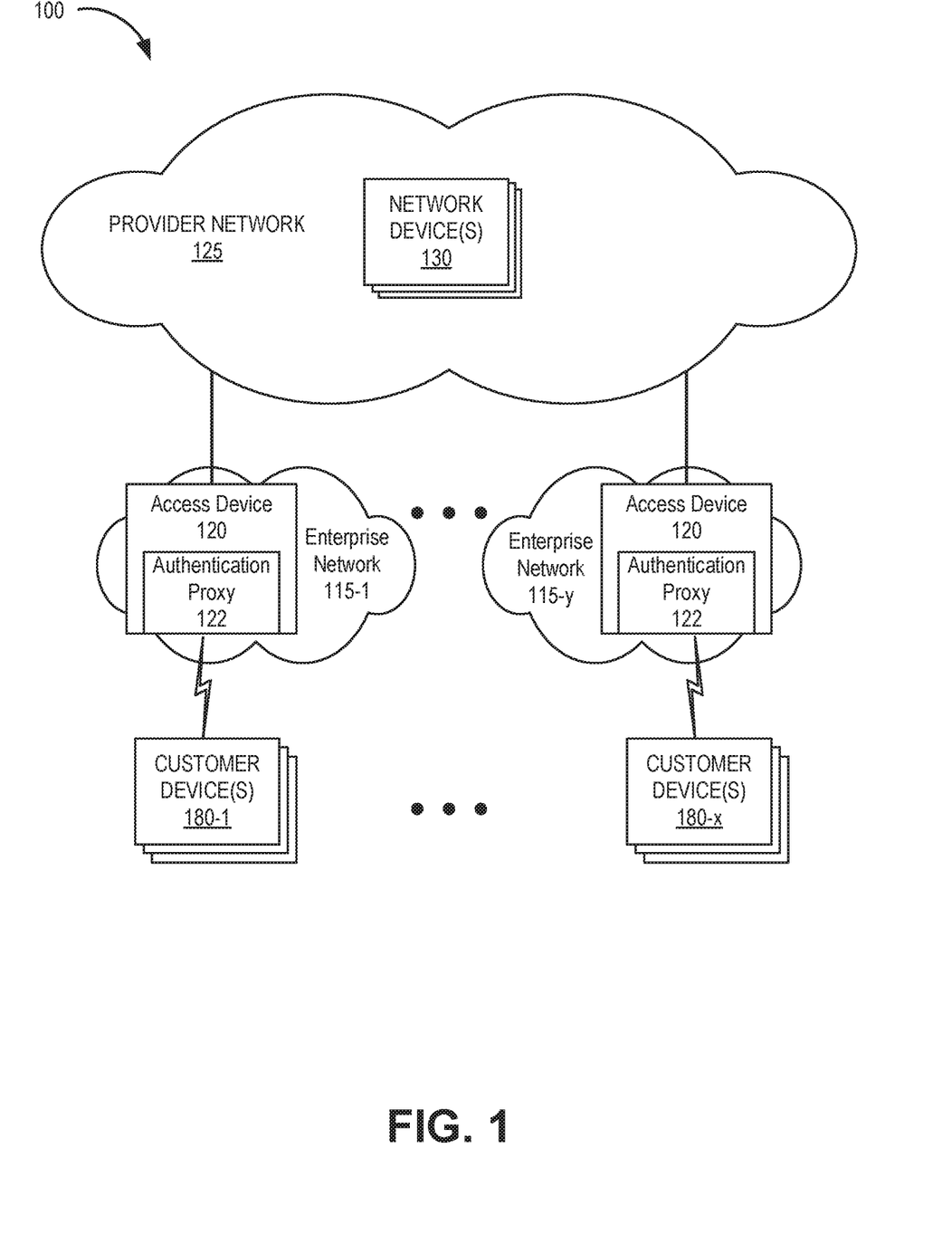
FIG. 1 is a diagram illustrating a network environment according to an implementation described herein.

FIG. 1 is a diagram of an exemplary network environment 100 in which the private network management service described herein, may be implemented. As shown in FIG. 1, environment 100 may include one or more enterprise networks 115-1-through 115-*y* (referred to herein generically as enterprise network 115), a service provider network 125, and customer devices 180-1 through 180-*x* (referred to herein generically as customer device 180). According to other embodiments, environment 100 may include additional networks, fewer networks, and/or different types of networks than those illustrated and described herein.

Environment 100 includes links between the networks and between devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

Enterprise network 115 (also referred to herein as "private network 115") may include a customer network (e.g., a private network) which may include a local area network (LAN), a wide area network (WAN), or a combination of networks. Enterprise network 115 may provide network access to devices in provider network 125 or serve as a stand-alone network. Different enterprise networks 115-1 through 155-*y* may have different network identifiers and each enterprise network 115 may have different group of subscription profiles (e.g., for customer devices 180).

In one implementation, enterprise network 115 may include a network interconnecting one or more customer devices 180 with other devices that provide: data services (e.g., network devices, personal computers, workstations, laptops, etc.); voice services (e.g., telephones); and/or video services (e.g., televisions, set-top boxes, etc.). In another implementation, enterprise network 115 may include one or more servers for customer devices 180. The servers may, for example, receive and process data from customer devices 180. In another implementation, enterprise network 115 may include one or more gateway (GW) routers (e.g., customer premises equipment) that act as a secure gateway for devices within enterprise network 115.

According to various exemplary embodiments, enterprise network 115 may be implemented to include various architectures of wireless service, such as, for example, macrocell, microcell, femtocell, picocell, metrocell, new radio (NR)

cell, LTE cell, non-cell, or another type of cell architecture. Additionally, according to various exemplary embodiments, enterprise network 115 may be implemented according to various wireless technologies (e.g., radio access technology (RAT), etc.), wireless standards, wireless frequencies/bands/carriers, licensed radio spectrum, unlicensed radio spectrum, and/or other attributes of radio communication.

Depending on the implementation, enterprise network 115 may include one or multiple types of network devices, such as access devices 120. For example, access device 120 may include a next generation Node B (gNB), an evolved Node B (eNB), an evolved LTE (eLTE) eNB, a radio network controller (RNC), a remote radio head (RRH), a baseband unit (BBU), a small cell node (e.g., a picocell device, a femtocell device, a microcell device, a home eNB, a repeater, etc.), a Wi-Fi access point, or another type of wireless node.

According to an exemplary embodiment, access device 120 includes an authentication proxy 122 that provides authentication services, as described herein. Authentication proxy 122 may communicate with provider network 125 and/or cache core network functionality to allow enterprise network 115 to benefit from core functionality of provider network 125 and perform subscriber management. For example, authentication proxy 122 may implement an Extensible Authentication Protocol (EAP) authentication server and may store authentication keys for customer devices 180. Additionally, or alternatively, authentication proxy 122 may authenticate a particular customer device 180 based on a customer device identity, such as a Permanent Equipment Identifier (PEI). For example, authentication proxy 122 may check to see if a PEI has been blacklisted. In one implementation, authentication proxy 122 may execute software provided from provider network 125.

Provider network 125 may include one or multiple networks of one or multiple types and technologies associated with a MNO. According to an exemplary embodiment, provider network 125 includes a network to connect and manage different parts of enterprise network 115. For example, provider network 125 may be implemented to include a 5G core network (also referred to as a next generation core (NGC) network), an EPC of an LTE network, a core network of an LTE-Advanced (LTE-A) network, and/or a core network of an LTE-A Pro network. Provider network 125 may also include a legacy core network.

Depending on the implementation, provider network 125 may include various types of network devices, such as network devices 130. For example, network devices 130 may include a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a mobility management entity (MME), a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, network devices 130 may include additional, different, and/or fewer network devices than those described. For example, network devices 130 may include a non-standard and/or proprietary network device. As described further herein, network devices 130 may include a user capability management function that may effectively serve as a private extension of a subscriber data manager (SDM), such as and HSS or UDM, to enable enterprise network users to perform administrative functions previously reserved for MNO administrators.

Customer device 180 (also referred to herein as an "end device") includes a device that has computational and wireless communication capabilities. Depending on the implementation, customer device 180 may be a mobile device, a portable device, a stationary device, a device operated by a user, or a device not operated by a user. For example, customer device 180 may be implemented as a smartphone, a personal digital assistant, a tablet, a netbook, a wearable device (e.g., a watch, glasses, etc.), a set top box, an infotainment system in a vehicle, a vehicle support system, a smart television, a game system, a music playing system, or other types of wireless customer devices. By way of further example, customer device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. Customer device 180 may be configured to execute various types of software (e.g., applications, programs, etc.). The number and the types of software may vary among customer devices 180.

Customer device 180 may support one or multiple radio access technologies (RATs, such as, 4G, 5G, etc.) and various portions of the radio spectrum (e.g., multiple frequency bands, multiple carrier frequencies, licensed, unlicensed, etc.), network slicing, DC service, and/or other types of connectivity services. Additionally, customer device 180 may include one or multiple communication interfaces that provide one or multiple (e.g., simultaneous) connections via the same or different RATs, frequency bands, carriers, network slices, and so forth. The multimode capabilities of customer device 180 may vary among customer devices 180.

According to an exemplary embodiment, customer device 180 may be provisioned (e.g., via a subscriber identity module (SIM) card or another secure element) to recognize particular network identifiers (e.g., associated with one or more of private networks 115 or another RAN) and to support particular radio frequency (RF) spectra.

Figure 2:
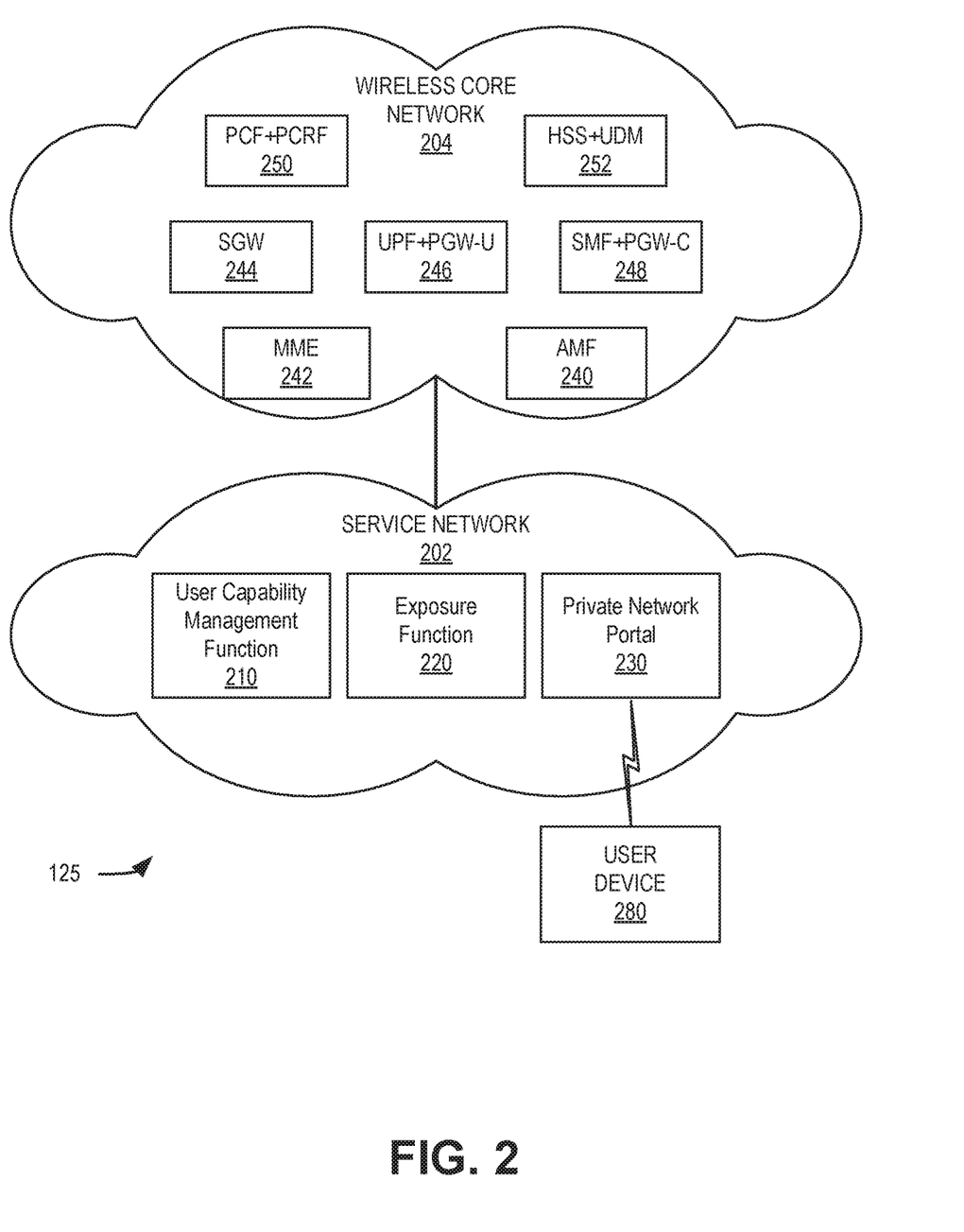
FIG. 2 is a block diagram illustrating components of the provider network of FIG. 1.

FIG. 2 is a block diagram illustrating components of provider network 125. According to implementations describe herein, provider network 125 may include a service network 202 and a wireless core network 204. In the example of FIG. 2, a user device 280 may access service network 202. User device 280 may include any communication or computational device, such as a personal computer, workstation, tablet, smartphone, etc. In one implementation, user device 280 may be outside of provider network and/or enterprise network 115.

Service network 202 may include a user capability management function 210, an exposure function 220, and a private network portal 230 for a private network management service. Each of user capability management function 210, exposure function 220, and private network portal 230 may be implemented in one or more network devices 130.

User capability management function 210 may provide receive and store information associated with customer devices 180 and/or information associated with users of customer devices 180. For example, user capability management function 210 may store subscription profiles that include authentication and access authorization information. Each subscription profile may associate a customer device 180 with an enterprise network 115, as well as an indication of whether customer device 180 is authorized to connect to provider network 125. User capability management function 210 may solicit and store information regarding user capabilities for customer devices 180, services available to customer devices 180, service locations for customer devices 180, location-based services for customer devices 180, etc. In one implementation, user capability management function 210 provides a private extension of a core network function to allow enterprise network administrators to provision subscribers, manage billing, differentiate enterprise customers, perform SIM management, and/or perform FCAPS (fault-management, configuration, accounting, performance, and security) functions. As described below, user capability management function 210 may be accessed, for example, via private network portal 230.

User capability management function 210 may allow users (e.g., enterprise network administrators) to provision their individual subscribers for different services (e.g., different services for different customer devices 180). For example, different customer devices 180 connecting to access device 120 may be granted access to different services and/or applications. One customer device 180, for example, may be granted access to voice and data services from provider network 125, while another customer device 180 may be granted access to voice services. Still another customer device 180 may be provisioned with only local access to enterprise network 115. In another implementation, user capability management function 210 may store subscription profiles configured with use restrictions or bearer preferences for a particular customer device 180, such as restricting a customer device 180 to certain bandwidth limits or data consumption.

User capability management function 210 may also allow users to manage billing for customer devices 180. For example, user capability management function 210 may solicit and provide billing instructions for charging network use, data, or services to a user account, a shared corporate (or group) account. In one implementation, User capability management function 210 may communicate with billing servers external to core network 204 or provider network 125 (e.g., billing servers for a partner entity or third party entity) or other conventional billing systems (e.g., on-line charging system (OCS), off-line charging system (OFCS), etc.).

User capability management function 210 may further differentiate traffic from customer devices 180 of different enterprise networks 115. For example, traffic for customer devices 180-1 associated with enterprise networks 115-1 may be distinguished from traffic for customer devices 180-2 associated with enterprise networks 115-2. In one implementation, each enterprise network 115 may be assigned a different network identifier that may be included with traffic to or from customer devices 180.

User capability management function 210 may additionally allow users to perform SIM management. For example, users may upload subscriber profiles to user capability management function 210 that may be downloaded onto a SIM card (e.g., an eUICC) of a customer device 180. Subscriber profiles may be enabled, disabled, deleted, etc., based on instructions provided by users of private network 115. In another implementation, user capability management function 210 may coordinate with a remote SIM provisioning platform (e.g., one of network devices 130) to provide instructions and initiate SIM profile management based on user input provided to user capability management function 210.

User capability management function 210 may also allow users to perform FCAPS functions. For example, user capability management function 210 may recognize, isolate, correct, and log faults that occur; manage device configurations; gather usage statistics to enforce usage quotas and apply to billing; monitor and track network statistics and trends; and/or control access to assets in provider network 125.

Exposure function 220 may expose capabilities and features of provider network 125 (or particularly core network 204) to customer devices 180 based on instructions and/or subscription profiles. For example, exposure function 220 may selectively provide access to third party network functions, application functions, edge computing network functions (e.g., MEC services), and/or other types of network functions. Furthermore, exposure function 220 may secure provisioning of information from external applications to core network 204, translate information between core network 204 and devices/networks external to core network 204, and/or perform other types of network exposure functions.

Private network portal 230 may include one or more network devices, server devices, or other types of computation or communication devices, that provide controlled external access to various components of provider network 125. For example, private network portal 230 may enable an authorized customer to access services for enterprise/private networks. In one implementation, private network portal 230 may provide a common web-based interface to access multiple types of services (e.g., various private network management services and other services). Access to data and/or services via private network portal 230 may be restricted, for example, to users with registered accounts and secure passwords (or other credentials).

Private network portal 230, according to an implementation, may provide access to enterprise network management services. Users (e.g., network administrators) of an enterprise network 115 may manage (e.g., introduce, configure, issue commands, update, monitor, etc.) policies for users, applications, and network functions associated with a particular enterprise network 115 via user device 280, for example. According to another implementation, private network portal 230 may provide a user interface (e.g., a web site or another network access) to allow a user (e.g., a customer, such as an enterprise network administrator) to interface with user capability management function 210 to manage and/or provision customer devices 180.

Core network 204 may include one or multiple networks of one or multiple network types and technologies. Core network 204 may include a complementary network of private network 115. For example, core network 204 may be implemented to include an Evolved Packet Core (EPC) of an LTE, an LTE-A, an LTE-A Pro, a next generation core (NGC) network, and/or a legacy core network.

According to one implementation, core network 204 may include an interworking 5G and LTE core network and may share common network elements (e.g., corresponding to one or more network devices 130). As shown in FIG. 2, core network 204 includes an Access and Mobility Function (AMF) 240, a Mobility Management Entity (MME) 242, a Serving Gateway (SGW) 244, a combined User Plane Function (UPF) and PDN Gateway—User Plane function (PGW-U) 246, a combined session management function and PDN gateway-control plane function (SMF+PGW-C) 248, a combined policy charging function and Policy and Charging Rules Function (PCF+PCRF) 250, and a combined unified data management function and home subscriber server (UDM+HSS) 252. Although core network 204 may have additional network nodes and/or functions that interact with one another via different interfaces, they are not illustrated in FIG. 3 for simplicity.

AMF 240 may perform registration management, connection management, reachability management, mobility management, lawful intercepts, access authentication and authorization, positioning services management, management of non-3GPP access networks, and/or other types of management processes. AMF 240 may interact with one of access devices 120 or customer devices 180 that support 5G radio access types.

MME 242 may provide control plane processing for an evolved packet core (EPC) in network 204. For example, MME 242 may implement tracking and paging procedures for customer device 180, may activate and deactivate bearers for customer device 180, may authenticate a user of customer device 180, and may interface to non-LTE radio access networks. A bearer may represent a logical channel with particular quality of service (QoS) requirements. MME 242 may also select a particular SGW (e.g., SGW 244) for a particular customer device 180. MME 242 may communicate with one of access devices 120 that supports 4G/LTE radio access.

SGW 244 may provide an access point to customer device 180, handle forwarding of data packets for customer device 180, perform transport level markings (e.g., QoS Class Identifier (QCI)), and act as a local anchor point during handover procedures between wireless stations. In addition, SGW 244 may forward messages between MME 242 and UPF+PGW-U 246. For example, when SGW 244 receives a message from MME 242 indicating that customer device 180 is unavailable to accommodate a request to change the bearer, SGW 244 may forward the message to UPF+PGW-U 246. SGW 244 may interact with access device 120, MME 242, and UPF+PGW-U 246.

UPF+PGW-U 246 may include a network device (e.g., a converged node) that provides UPF functionality for 5G and user plane functionality for 4G. SMF+PGW-C 248 may maintain an anchor point for intra/inter-RAT mobility, maintain an external Packet Data Unit (PDU) point of interconnection to a data network (not shown), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a RAN node (e.g., access device 120), and/or perform other types of user plane processes. UPF+PGW-U 246 may communicate with SMF+PGW-C 248 and data networks (not shown).

PCF+PCRF 250 may support policies to control network behavior, provide policy rules to control plane functions (e.g., to SMF+PGW-C 248), access subscription information relevant to policy decisions, make policy decisions, and/or perform other types of processes associated with policy enforcement. PCF+PCRF 250 may specify QoS policies based on QoS flow identity (QFI) consistent with, for example, 5G network standards.

HSS+UDM 252 may store subscription information associated with customer devices 180 and/or information associated with users of customer devices 180. For example, HSS+UDM 252 may store subscription profiles that include authentication, access, and/or authorization information. Each subscription profile may include information identifying customer device 180, authentication and/or authorization information for customer device 180, information identifying services enabled and/or authorized for customer device 180, device group membership information for customer device 180, and/or other types of information associated with customer device 180. According to one implementation, HSS+UDM 252 may receive, from user capability management function 210, subscription profiles generated based on input parameters to private network portal 230.

Depending on the implementation of provider network 125, provider network 125 may include various types of other networks and/or network devices that are not illustrated in FIG. 2. For example, in another implantation, provider network 125 may include a MEC network, the access to which can be controlled by policies and/or subscription profiles of core network 204. Thus, according to other exemplary implementations, provider network 125 may include additional, different, and/or fewer network devices than those described.

Figure 3:
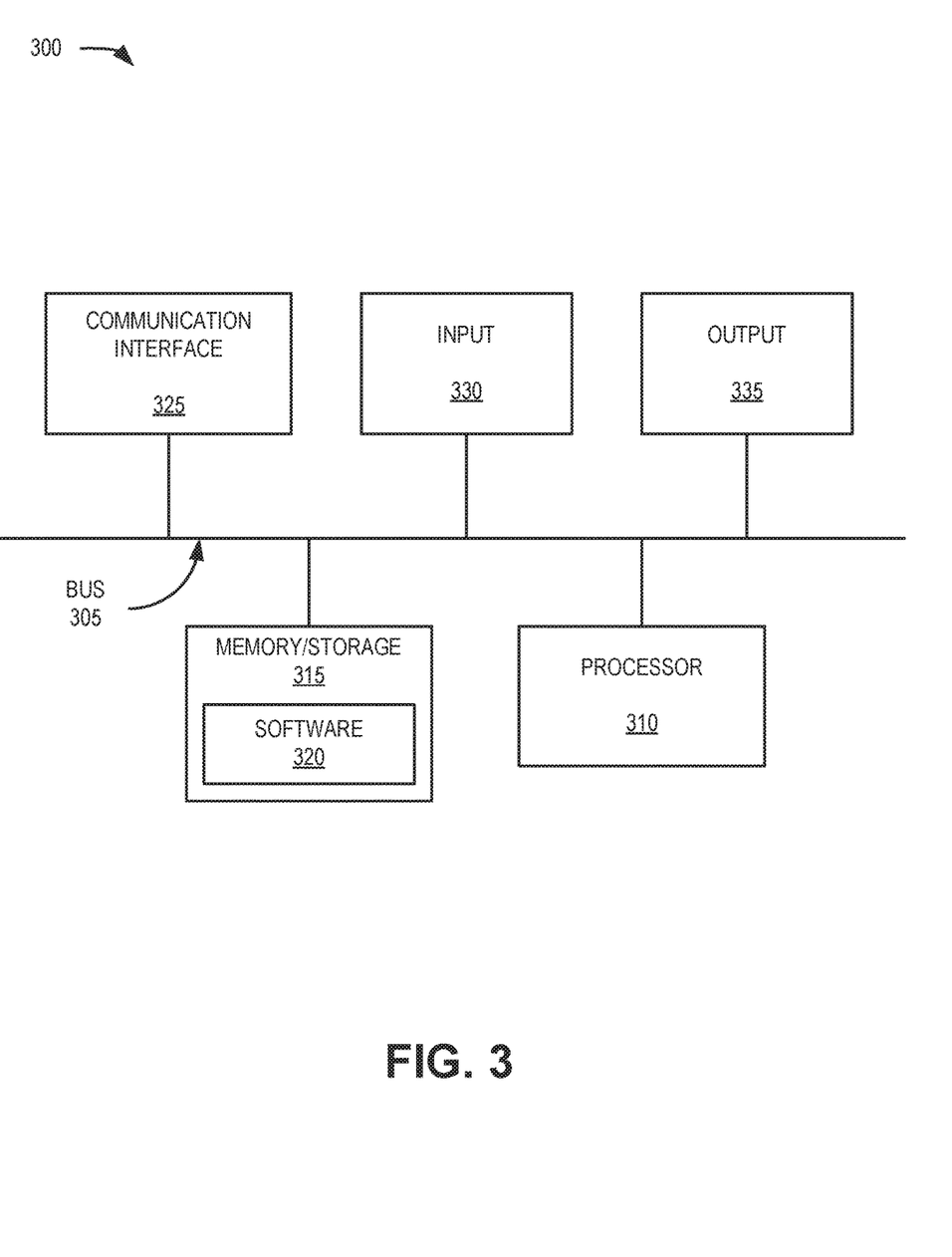
FIG. 3 is a diagram of exemplary components that may be included in one or more of the devices shown in FIGS. 1 and 2.

FIG. 3 is a diagram illustrating example components of a device 300 according to an implementation described herein. Access devices 120, network device 130, customer device 180, user device 280, or any of the elements of service network 220 or core network 204. AMF 240, MME 242, SGW 244, UPF+PGW-U 246, SMF+PGW-C 248, PCF+PCRF 250, and HSS+UDM 252 may each include one or more devices 300. In another implementation, a device 300 may include multiple network functions. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. For example, access device 120 and user capability management function 210 may include logic to perform tasks based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a communication standard and/or protocols. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored in memory/storage 315, when executed by processor 310, cause processor 310 to perform a process described herein. Alternatively, for example, according to other implementations, device 300 performs a process described herein based on hardware configurations.

Figure 4A:
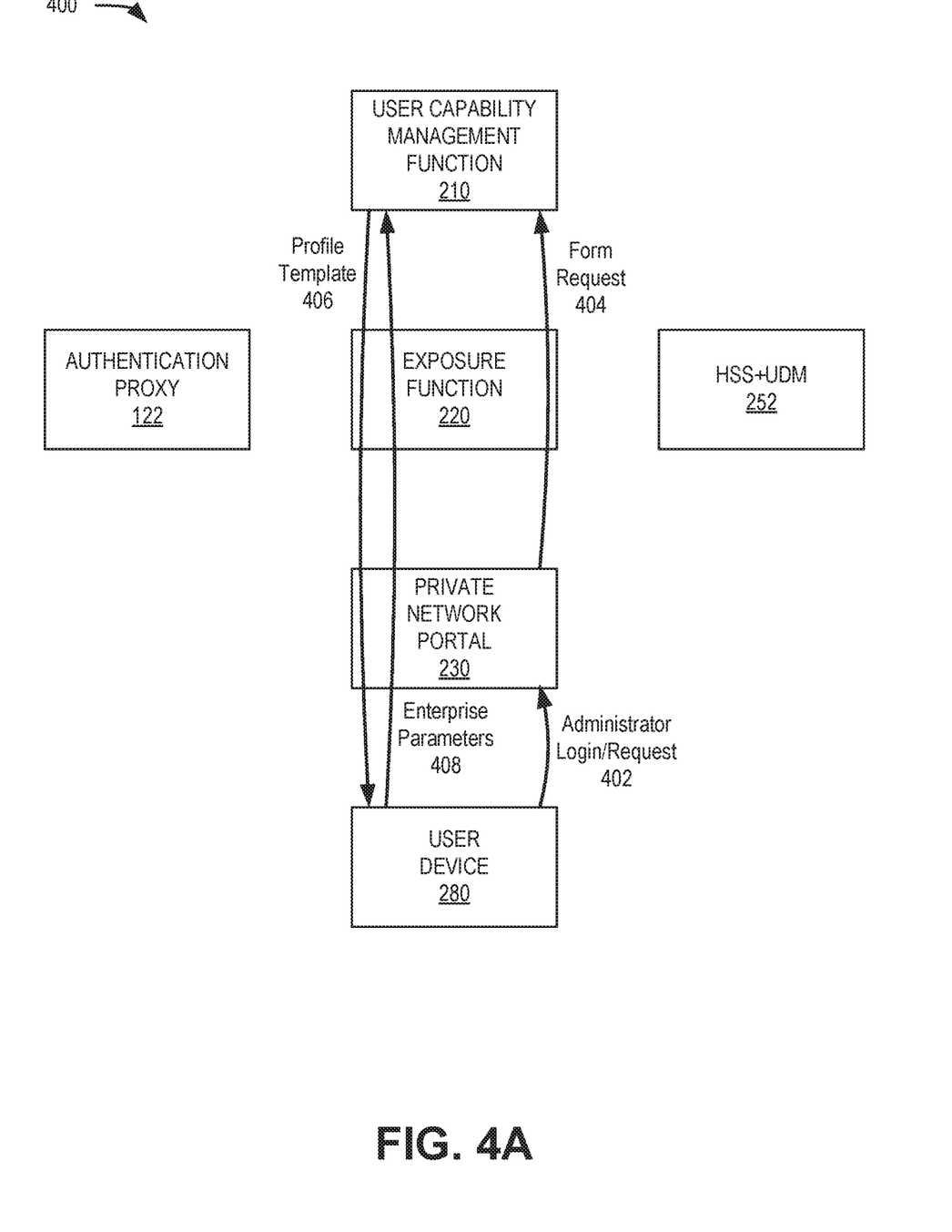
FIGS. 4A and 4B are diagrams illustrating exemplary communications for provisioning customer devices of a private network in a portion of the network environment of FIG. 1.
Figure 4B:
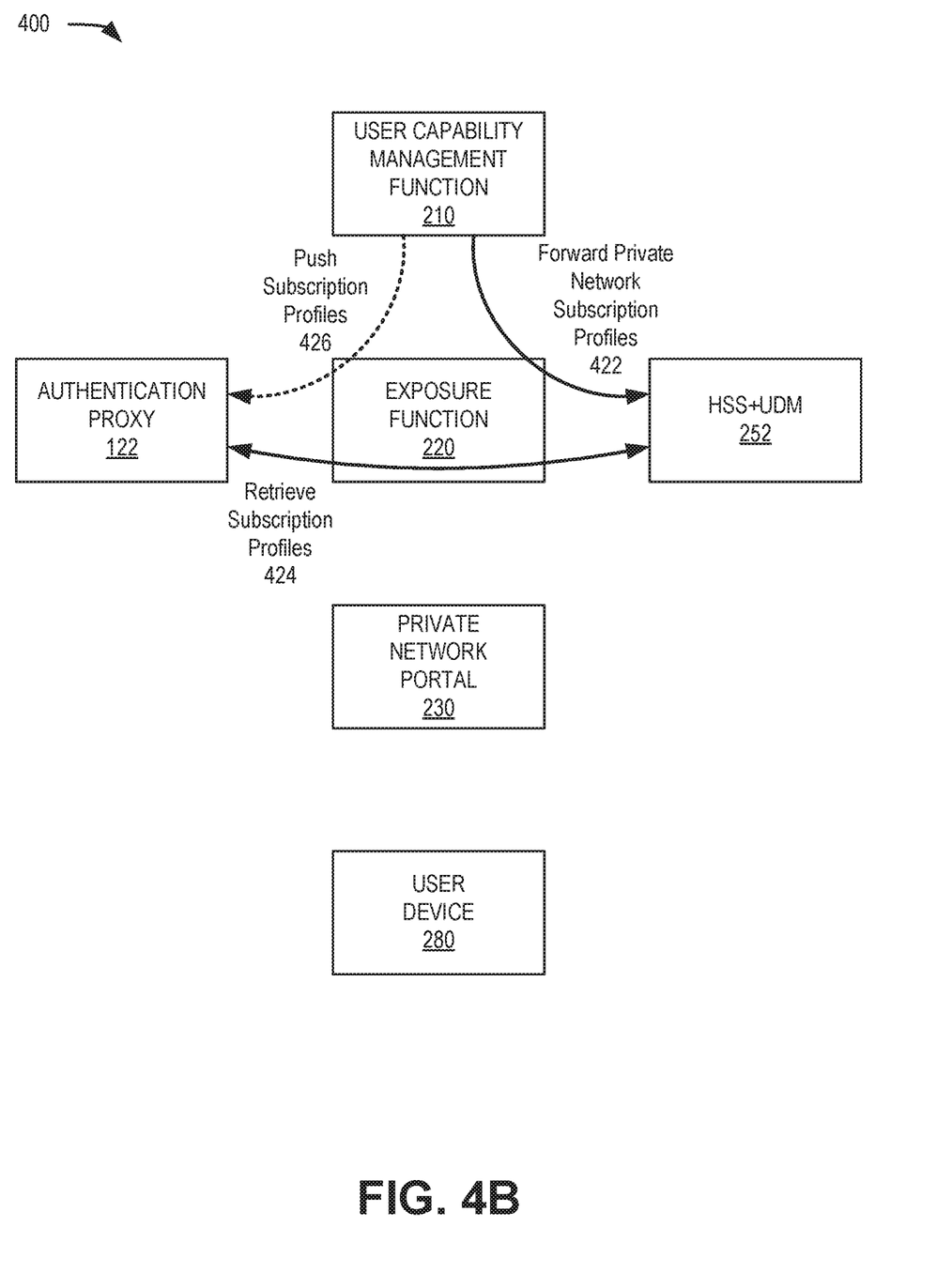

FIGS. 4A and 4B are diagrams illustrating an exemplary process of an embodiment of the private network management service. FIGS. 4A and 4B show communications to provision and/or configure customer devices for private networks in a network environment 400. Communications shown in FIGS. 4A and 4B provide simplified illustrations of communications in environment 400 and are not intended to reflect every signal or communication exchanged between devices.

As illustrated in FIG. 4A, environment 400, which is consistent with networks in FIGS. 1 and 2, includes authentication proxy 122, user capability management function 210, exposure function 220, private network portal 230, HSS+UDM 252, and user device 280. Using user device 280, a user (e.g., a network administrator) of private network 115 may login through private network portal 230 and submit a request to manage subscriber devices (e.g., customer devices 180-1) associated with a private network (e.g., private network 115-1), as indicated by reference 402. For example, a registered user may provide a user name and passcode to access services for provisioning subscribers. Once authenticated, user device 280 may select a private web-based interface, for example, from private network portal 230 to manage subscriber services. Private network portal 210 may, in turn, provide a form request 404 to user capability management function 210, which may provide a profile template 406 for use by user device 280.

User device may receive profile template 406, which may include a table, a form, multiple user interface pages, or other controls to solicit structured user input. For example, profile template 406 may include a user interface with selection mechanisms, such as a radio button, a checkbox, a dropdown menu, etc., to allow a user to select from one or more of a set of structured options available to the particular customer (e.g., a particular QoS class, a particular bandwidth, particular service types, etc.). Using profile template 406, a user of user device 280 may submit enterprise parameters 408. Enterprise parameters 408 may include, for example: information pertaining to particular services (e.g., voice service, data service, voice-over-IP service, etc.) to which a user (e.g., associated with a customer device 180) can access; policies/charging parameters, QoS profiles; a subscription priority with respect to prioritized access to network 125; a mobility category information based on an intended usage of the customer device 180; information indicating use restrictions or bearer preferences for a particular customer device 180, such as restricting a particular customer device 180 to certain aggregated bandwidth limits; authentication and/or authorization information; etc. In one implementation, for example, enterprise parameters 408 may include one set of configuration information for a batch of IoT-type devices and a different set of configuration information for employees' mobile devices. User device 280 may forward enterprise parameters 408 to user capability management function 210.

Referring to FIG. 4B, user capability management function 210 may receive enterprise parameters 408 and assemble private network subscription profiles for each customer device 180 based on enterprise parameters 408. In one implementation, user capability management function 210 may associate, in the subscription profiles, parameters for each customer device 180-1 with a private network identifier for private network 115-1. User capability management function 210 may forward subscription profiles 422 to HSS+UDM 252. HSS+UDM 252 may receive and store subscription profiles 422.

Authentication proxy 122 may retrieve the subscription profiles 424 for use in local authentication at private network 115. For example, authentication proxy 122 may retrieve all the subscription profiles 424 associated with the private network identifier for private network 115. The retrieved subscription profiles 424 may include, for example, all or part of subscription profiles 422. Alternatively, user capability management function 210 may push the subscription profiles 426 to authentication proxy 122. In one implementation, authentication proxy 122 may cache the retrieved subscription profiles 424 (or pushed subscription profiles 426) to use during subsequent access requests from customer devices 180. In another implementation, authentication proxy 122 may communicate with HSS+UDM 252 or other network devices 130 in core network 204 (e.g., as permitted by exposure function 220) to locally provide network functionally of core network 204.

Figure 5:
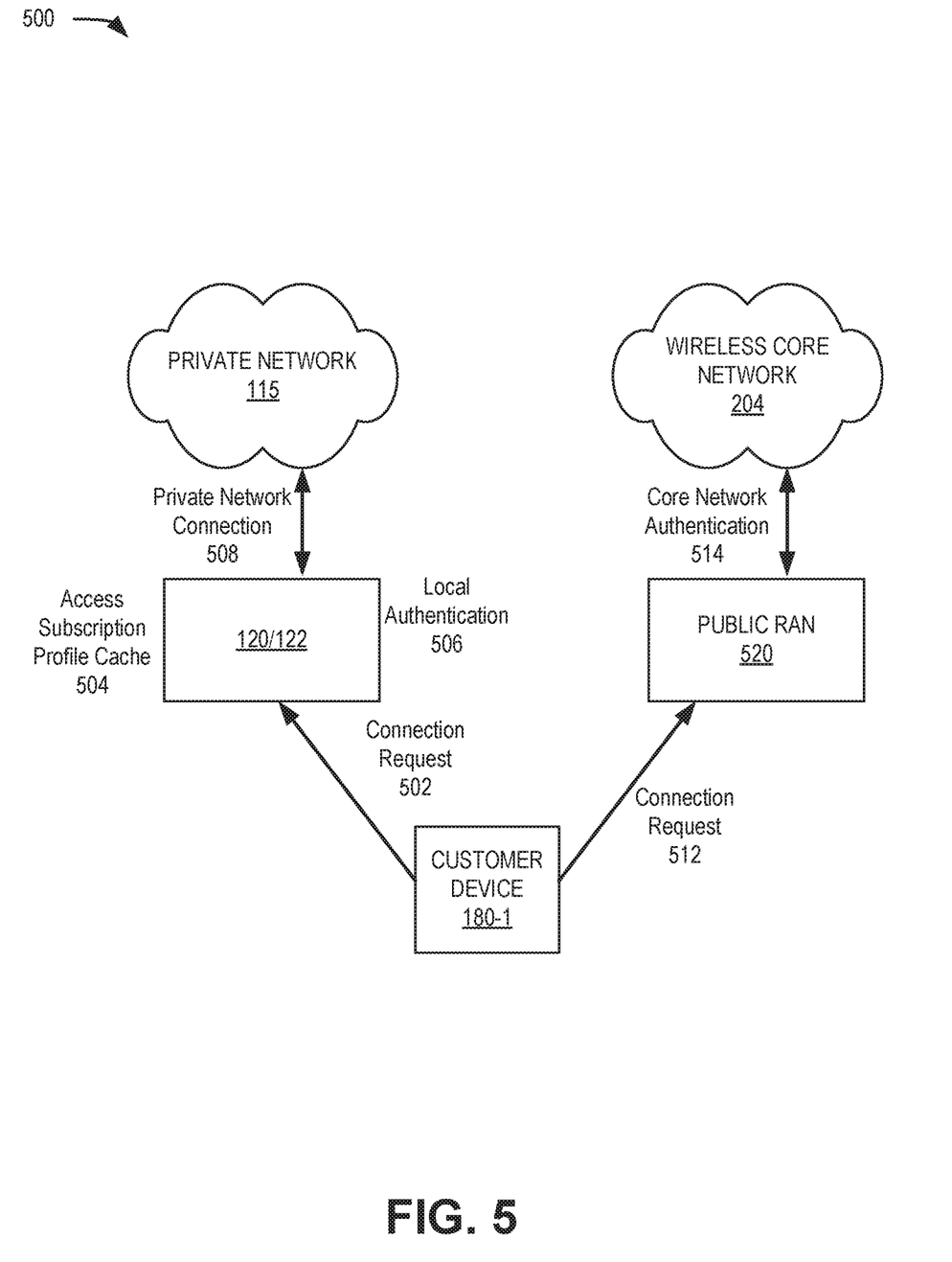
FIG. 5 is a diagram illustrating exemplary communications for authenticating customer devices of a private network in another portion of the network environment of FIG. 1.

FIG. 5 illustrates communications for network attachment by a customer device after provisioning, according to implementations described herein. Referring to FIG. 5, a network environment 500 includes an access device 120 with authentication proxy 122, customer devices 180-1, private network 115, wireless core network 204, and a public RAN 520. Assume customer device 180-1 has been provisioned (e.g., as described in FIGS. 4A and 4B) for mobility access with core network 204 when outside of private network 115. Public RAN may include, for example, a radio access network accessible to subscribers of provider network 125. FIG. 5 provides simplified illustrations of communications in environment 500 and is not intended to reflect every signal or communication exchanged between devices.

As shown in FIG. 5, customer device 180-1 may submit a connection request 502 to access device 120. For example, customer device 180-1 may send a radio resource control (RRC) Connection Request message to access device 120 using a shared spectrum. Authentication proxy 122 of access device 120 may access a subscription profile cache (e.g., corresponding to retrieved subscription profiles 424) and determine that customer device 180-1 is registered with private network 115. Authentication proxy 122 may perform a local authentication 506 for customer device 180-1 (e.g., without relying on communications with core network 204) using the subscription profile information.

For local authentication 506, authentication proxy 122 may implement techniques for authenticating a user, an application, and/or the corresponding customer device 180-1, at which the application is installed, that requests access to private network 115. To access certain data or services of private network 115, authentication proxy 122 may require a user of customer device 180-1 to provide appropriate credentials, such as a user identifier and a correct corresponding password. According to one implementation, authentication proxy 122 may enforce different access levels for different users, where each access level grants or restricts access to select features of private network 115. For example, to ensure that services offered by private network 115 are available to only authorized devices/users, users may be registered and assigned different access levels or to a particular access group. Access levels may be hierarchical (e.g., with each level granting access to more information), distributed (e.g., with each access level granting access to different information), or combinations thereof. Assuming customer device 180-1 is authenticated, access device 120 may establish a private network connection for customer device 180-1 with devices in private network 115. Thus, information from customer device 180 stays only on private network 115 and is not sent to a public network (e.g., wireless core network).

Still referring to FIG. 5, when customer device 180-1 exits the geographic area of private network 115 and access device 120, customer device 180-1 may initiate another connection request 512. For example, customer device 180-1 may send a RRC Connection Request message to a public RAN 520 using a spectrum assigned to an owner of provider network 125. Public RAN (e.g., an eNB or gNB) may receive connection request 512 and may exchange signals with wireless core network 204 to perform core network authentication 514 based on, for example, a subscription profile stored in HSS+UDM 252. According to one implementation, HSS+UDM 252 may synchronize/confirm with authentication proxy 122 use of a subscription profile for customer device 180-1 when wireless core network 204 identifies (e.g., based on the private network identifier) that customer device 180-1 is associated with private network 115.

Figure 6:
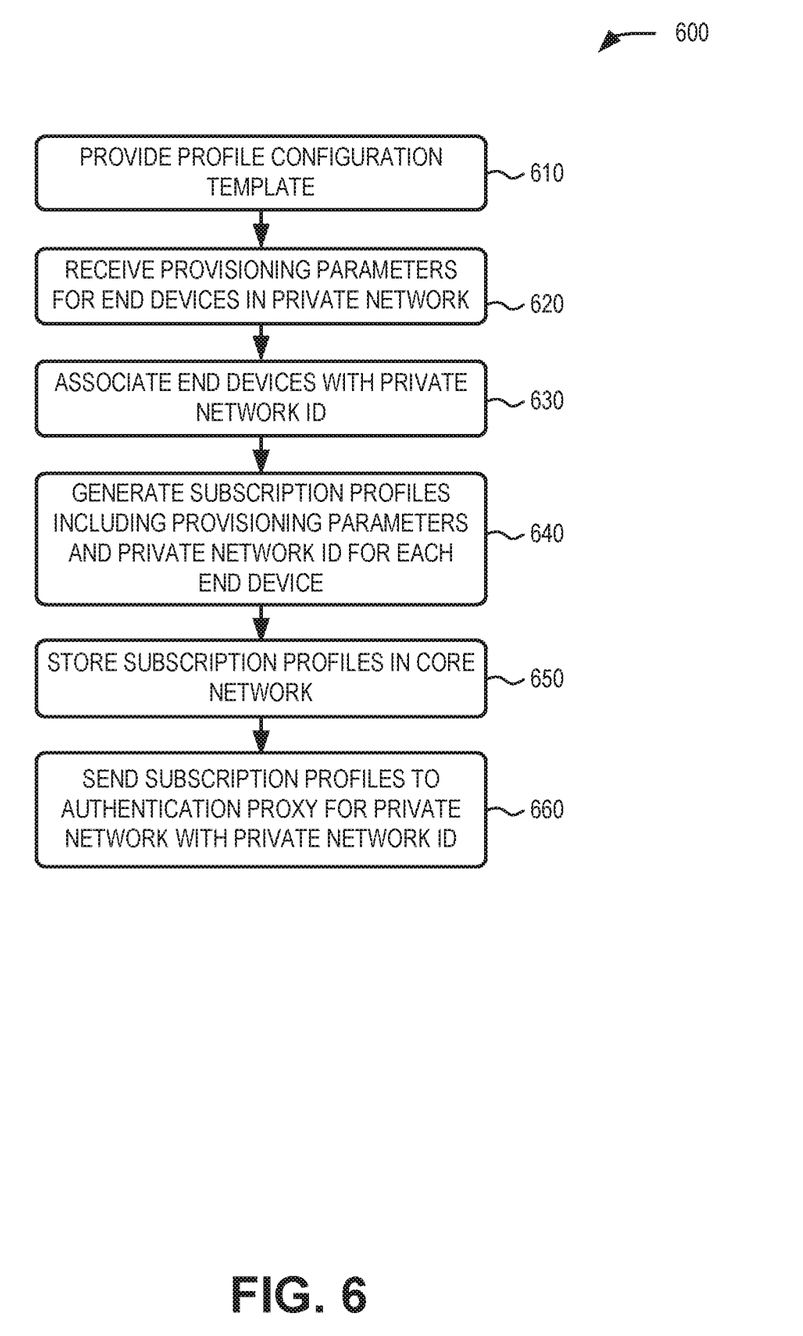
FIG. 6 is a flow diagram illustrating an exemplary process for provisioning customer devices using the private network management service, according to an implementation described herein.

FIG. 6 is a flow diagram illustrating an exemplary process for provisioning private network subscribers, according to an implementation described herein. Process 600 may be implemented by one or more devices in provider network 125.

Process 600 may include providing a profile configuration template (block 610) and receiving provisioning parameters for end devices in a private network (block 620). For example, user capability management function 210 may provide a subscription profile form to a registered user via private network portal 230. Using the subscription profile form, the user may provide structured input for subscription profile for multiple customer devices 180. User capability management function 210 may receive the user input via private network portal 230.

Process 600 may further include associating the end devices with a private network identifier (block 630), and generating subscription profiles that include the provisioning parameters and private network identifier for each end device (block 640). For example, each structured input entered by the registered user may be associated with a private network identifier. User capability management function 210 may receive the structured input and associated private network identifier and generate a subscription profile (e.g., in a format usable by HSS+UDM 252 and authentication proxy 122.

Process 600 may additionally include storing the subscription profiles in a core network (block 650), and sending the subscription profiles to an authentication proxy for a private network associated with the private network identifier (block 660). For example, user capability management function 210 may send the subscription profiles to HSS+UDM 252 for use by devices in core network 204. Additionally, authentication proxy 122 may retrieve the subscription profiles, or user capability management function 210 may forward the subscription profiles to authentication proxy 122.

Figure 7:
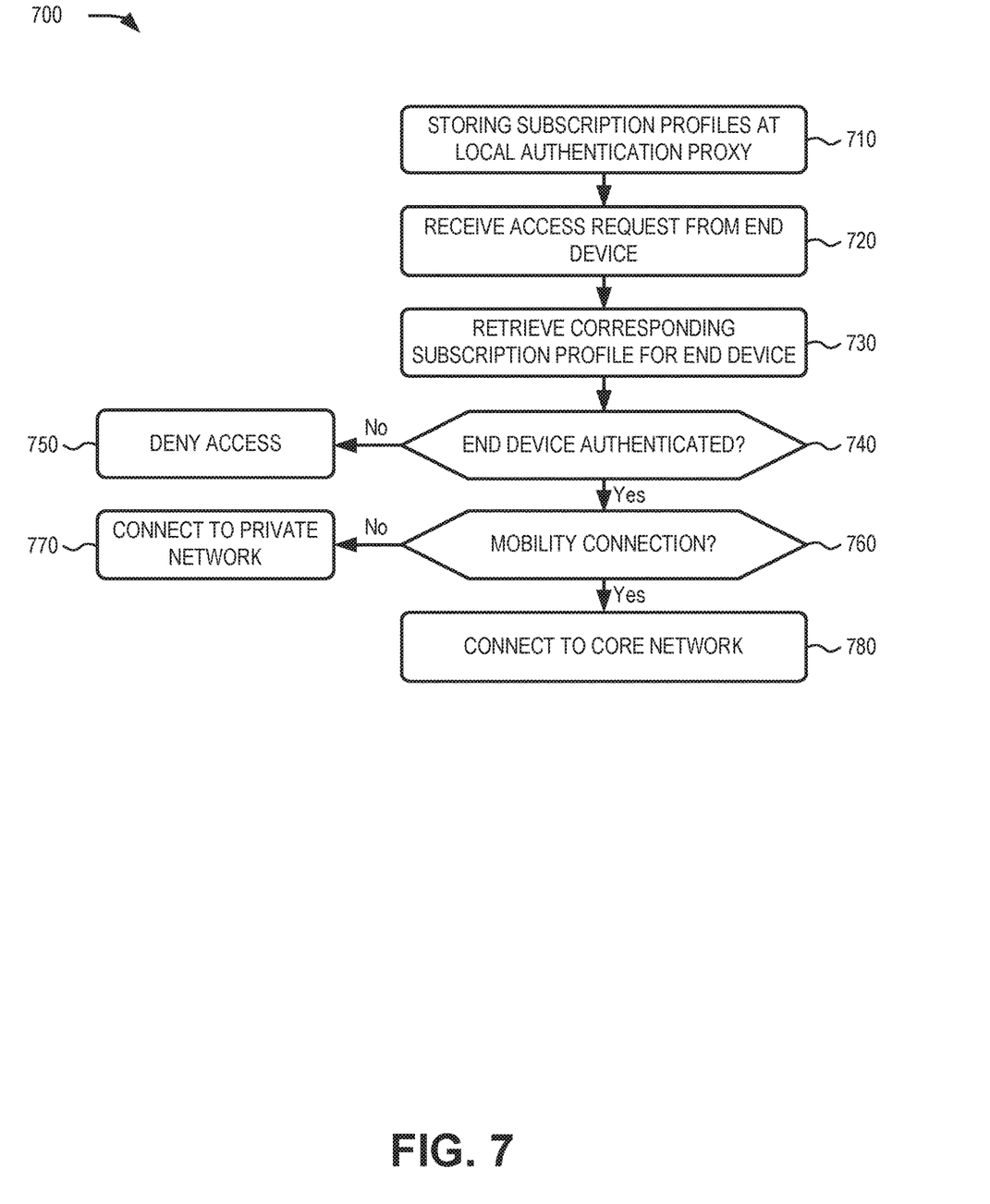
FIG. 7 is a flow diagram illustrating an exemplary process for authenticating customer devices using the private network management service, according to an implementation described herein.

FIG. 7 is a flow diagram illustrating an exemplary process for provisioning private network subscribers, according to an implementation described herein. Process 700 may be implemented by access device 120 and authentication proxy 122. In another implementation, process 700 may be implemented by access device 120 in conjunction with one or more devices in provider network 125.

Process 700 may include storing subscription profiles for a private network at a local authentication proxy (block 710), and receiving an access request from an end device (block 720). For example, authentication proxy 122 may store subscription profiles associated with a particular private network ID. One or more customer devices 180 may subsequently request a network connection via access device 120.

Process 700 may further include retrieving a corresponding subscription profile for the end device (block 730), and authenticating the end device based on the retrieved subscription profile (block 740). For example, in response to a connection request, authentication proxy 122 executing on access device 120 may retrieve a subscription profile for the corresponding customer device 180 and user information from the subscription profile to authenticate the customer device 180.

If the end device is not authenticated (block 740—No), access may be denied (block 750). For example, if authentication proxy 122 finds a subscription profile for the customer device 180, but cannot authenticate customer device 180, authentication proxy 122 may deny network access to the customer device 180.

If the end device is authenticated (block 740—Yes), process 700 may include determining if the end device requires a mobility connection (block 760). For example, if authentication proxy 122 finds a subscription profile for the customer device 180 and authenticates customer device 180, authentication proxy 122 may determine (e.g., based on the subscription profile) whether customer device 180 is provisioned for private network access or public network access.

If the end device does not require a mobility connection (block 760—No), the end device may be connected to the private network (block 770). For example, access device 120 may connect customer device 180 to network devices in private network 115. If the end device requires a mobility connection (block 760—Yes), the end device may be connected to the core network (block 780). For example, access device 120 may forward the connection request of customer device 180 to core network 204.

Systems and methods described herein provide for private/enterprise networks to locally manage wireless network subscriptions and locally authenticate customer devices on the private network. The systems and methods enable enterprise customers to manage subscriber services, authenticate the enterprise users from the private network onto the core network, and maintain admission control to make sure the information from the private network user stays only on the private network and is not sent to or exposed to a public network based on RF characteristics for the carrier.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to process illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by one or more network devices of a provider network associated with a mobile network operator (MNO) and from a user of an enterprise customer network, parameters for multiple subscription profiles associated with different end devices of the enterprise customer network;
   associating, by the one or more network devices, the multiple subscription profiles with an identifier for the enterprise customer network to create private network subscription profiles, wherein the private network subscription profiles associate the end devices with the enterprise customer network and indicate whether the end devices are authorized to connect to the provider network;
   storing, by the one or more network devices, the private network subscription profiles; and
   providing, by the one or more network devices, at least a portion of the private network subscription profiles from a core network of the provider network to an authentication proxy in the enterprise customer network,
   wherein the authentication proxy performs authentication for one of the end devices based on the private network subscription profiles.

2. The method of claim 1, further comprising:
   providing, by the one or more network devices, a profile configuration template to solicit the parameters.

3. The method of claim 1, wherein receiving the parameters includes:
   receiving parameters for wireless service from the core network.

4. The method of claim 1, wherein receiving the parameters includes:
   receiving parameters for wireless service from the enterprise customer network.

5. The method of claim 1, wherein storing the private network subscription profiles comprises:
   storing the private network subscription profiles in one or more of a Home Subscriber Server (HSS) device or unified data management (UDM) device for the core network.

6. The method of claim 1, further comprising:
   receiving, by the one or more network devices and from the user of the enterprise customer network, additional parameters for billing functions or fault-management, configuration, accounting, performance, and security (FCAPS) functions of the core network; and
   storing, in a memory of the one or more network devices, the additional parameters associated with the customer devices.

7. The method of claim 1, wherein the enterprise customer network uses an unlicensed or shared radio frequency (RF) spectrum, and
   wherein the authentication proxy is included in a wireless access device for the enterprise customer network.

8. The method of claim 7, further comprising:
   storing, by the wireless access device, the private network subscription profiles;
   receiving, by the wireless access device, a Radio Resource Control (RRC) connection request from an end device; and
   authenticating, by the wireless access device, the end device for a connection to the enterprise customer network based on the private network subscription profiles.

9. One or more network devices, comprising:
   a commutation interface to communicate with an access device and a user device; and
   one or more processors configured to:
   receive, within a provider network associated with a mobile network operator (MNO) and from a user device outside the provider network, parameters for multiple subscription profiles associated with different end devices of the enterprise customer network;
   associate the multiple subscription profiles with an identifier for an enterprise customer network to create private network subscription profiles, wherein the private network subscription profiles associate the end devices with the enterprise customer network and indicate whether the end devices are authorized to connect to the provider network;
   store the private network subscription profiles; and
   provide at least a portion of the private network subscription profiles from a core network of the provider network to an authentication proxy in the enterprise customer network,
   wherein the authentication proxy performs authentication for one of the end devices based on the private network subscription profiles.

10. The one or more computing devices of claim 9, wherein the one or more processors are further configured to:
    provide a profile configuration template to solicit the parameters.

11. The one or more computing devices of claim 9, wherein the parameters include parameters for receiving wireless service from the core network.

12. The one or more computing devices of claim 9, wherein the parameters include parameters for receiving service from the enterprise customer network.

13. The one or more computing devices of claim 9, wherein, when storing the private network subscription profiles, the one or more processors are further configured to:
    store the private network subscription profiles in one or more of a Home Subscriber Server (HSS) device or unified data management (UDM) device for the core network.

14. The one or more computing devices of claim 9, wherein the one or more processors are further configured to:
    receive, from the user, additional parameters for billing functions or fault-management, configuration, accounting, performance, and security (FCAPS) functions of the core network; and
    store, in the memory, the additional parameters associated with the customer devices.

15. The one or more computing devices of claim 9, wherein, when storing the private network subscription profiles, the one or more processors are further configured to:
  store the private network subscription profiles with other private network subscription profiles, wherein the private network subscription profiles and the other private network subscription profiles are distinguished based on a private network identifier associated with a subscription profile of each end device.

16. The one or more computing devices of claim 9, wherein the authentication proxy is included in a wireless access device for the enterprise customer network.

17. A non-transitory computer-readable medium containing instructions executable by at least one processor, the computer-readable medium comprising one or more instructions to cause the at least one processor to:
  receive, within a provider network and from a user of an enterprise customer network, parameters for multiple subscription profiles;
  associate the multiple subscription profiles with an identifier for the enterprise customer network to create private network subscription profiles, wherein the private network subscription profiles associate end devices with the enterprise customer network and indicate whether the end devices are authorized to connect to the provider network;
  store the private network subscription profiles; and
  provide at least a portion of the private network subscription profiles from a core network of the provider network to an authentication proxy in the enterprise customer network,
  wherein the authentication proxy performs authentication for the end devices based on the private network subscription profiles.

18. The non-transitory computer-readable medium of claim 17, further comprising instructions to cause the at least one processor to:
  provide a profile configuration template to solicit the parameters, wherein the profile configuration template includes controls to solicit structured user input.

19. The non-transitory computer-readable medium of claim 18, wherein the profile configuration template to solicit the parameters incudes parameters for the wireless core network.

20. The non-transitory computer-readable medium of claim 18, further comprising instructions to cause the at least one processor to:
  provide, to a remote subscriber identity module (SIM) provisioning platform and based on the parameters, instructions to initiate SIM profile change on one of the end devices.

* * * * *